United States Patent
Sjolander et al.

(10) Patent No.: US 12,303,983 B2
(45) Date of Patent: May 20, 2025

(54) CONTROL SYSTEM FOR GRINDING APPARATUS

(71) Applicant: C.M.E. BLASTING & MINING EQUIPMENT LTD., Oakville (CA)

(72) Inventors: Bjorn Sjolander, Oakville (CA); Bo Thomas Sjolander, Oakville (CA)

(73) Assignee: C.M.E. BLASTING & MINING EQUIPMENT LTD., Oakville (CA)

( * ) Notice: Subject to any disclaimer, the term of this patent is extended or adjusted under 35 U.S.C. 154(b) by 512 days.

(21) Appl. No.: 17/621,245

(22) PCT Filed: Jun. 25, 2020

(86) PCT No.: PCT/CA2020/000076
§ 371 (c)(1),
(2) Date: Dec. 21, 2021

(87) PCT Pub. No.: WO2020/257911
PCT Pub. Date: Dec. 30, 2020

(65) Prior Publication Data
US 2022/0410342 A1    Dec. 29, 2022

(30) Foreign Application Priority Data

Jun. 25, 2019 (CA) .................................. 3048076

(51) Int. Cl.
*B23B 31/117*    (2006.01)
*B24B 3/33*       (2006.01)
*B24B 41/04*      (2006.01)
*B24B 51/00*      (2006.01)

(52) U.S. Cl.
CPC ............ *B23B 31/1175* (2013.01); *B24B 3/33* (2013.01); *B24B 41/04* (2013.01); *B24B 51/00* (2013.01)

(58) Field of Classification Search
CPC ......... B24B 55/02; B24B 3/33; B24B 41/002; B24B 27/04
See application file for complete search history.

(56) References Cited

U.S. PATENT DOCUMENTS 7,402,093 B2    7/2008    Sjolander et al.

FOREIGN PATENT DOCUMENTS

WO    2005/092569 A1    10/2005
WO    2018/160658 A2    9/2018

*Primary Examiner* — Joel D Crandall
(74) *Attorney, Agent, or Firm* — Volpe Koenig

(57) ABSTRACT

A grinding apparatus for grinding working tips of hard metal inserts of rock drill bits, including a grinding machine, means for holding a rock drill bit to be ground and a support system. The grinding apparatus is equipped with a spindle assembly having an output drive shaft. One of a plurality of grinding tool cups is detachably connected to the output drive shaft for grinding the working tips. The grinding apparatus further includes a control system having a programmable operator control panel capable of monitoring and adjusting one or more operational parameters An RFID reader is provided within operator control panel such that when the free end of a grinding cup equipped with an RFID tag is inserted into the RFID reader a proximity sensor detects and scans the RFID tag, to obtain data including a specific ID identifier for the particular grinding cup and the number of grinding cycles used.

19 Claims, 10 Drawing Sheets

CONTROL SYSTEM FOR GRINDING APPARATUS

BACKGROUND

The present disclosure relates to improvements in apparatus for grinding the hard metal inserts or working tips of rock drill bits (percussive or rotary), tunnel boring machine cutters (TBM) and raised bore machine cutters (RBM) and more specifically, but not exclusively, for grinding the cutting teeth or buttons of a rock drill bit or cutter.

In drilling operations the cutting teeth (buttons) on the drill bits or cutters become flattened (worn) after continued use. A factor contributing to premature rock drill bit failure and poor drilling performance is operating beyond the reconditioning point. Failure to regrind in time can prove costly. Regular maintenance of the drill bit or cutter by regrinding (sharpening) the buttons to restore them to substantially their original profile enhances the bit/cutter life, speeds up drilling and reduces drilling costs. Regrinding should be undertaken when the wear of the buttons is optimally one third to a maximum of one-half the button diameter.

Regular maintenance on rock drill bits is important to maintain maximum penetration rates and to avoid overheating the bit, as this can destroy its metallurgical properties. Re-profiling the carbide button and removing excess steel is important in order to optimize drill bit service life, enhance the performance of the entire drilling operation and keep down the drilling and grinding costs.

A range of different manual and semi-automatic grinding apparatus have been developed including hand held grinders, single arm and double arm grinding machines and grinders designed specifically for mounting on drill rigs, service vehicles or set up In the shop.

These types of machines utilize a grinding machine having a spindle or rotor rotated at high speed. A grinding cup or grinding pin, mounted on the end of the rotor or spindle, grinds the button and typically the face of the bit/cutter surrounding the base of the button to restore the button to substantially its original profile for effective drilling. In addition to the rotation of the grinding cup, these types of grinding machines may include features where the grinding machine is mounted at an angle to the longitudinal axis of the button and the grinding machine is rotated to provide orbital motion with the center of rotation lying in the center of the grinding cup. When grinding the buttons, the centering aspects of the grinding machine tend to center the grinding machine over the highest point on the button.

Longstanding problems with these types of grinding machines are vibration and noise due to high rotational speeds, wear, the requirement for large compressors for pneumatic systems and long grinding times per button, in the larger sizes.

The grinding cups conventionally consist of a cylindrical body having top and bottom surfaces. The bottom or working surface consists of a diamond/metal matrix having a centrally disposed recess having the desired profile for the button to be ground. The rim around the recess may be adapted, for example by bevelling, to remove steel from the face of the bit around the base of the button.

Water and/or air, optionally with some form of cutting oil, is provided to the grinding surface to flush and cool the surface of the button during grinding.

The grinding cups are provided in different sizes and profiles to match the standard sizes and profiles of the buttons on the drill bits or cutters. Typically the button diameter varies from 6 mm up to 26 mm.

Several different methods have been used to connect and retain the grinding cups on to the grinding machine. The grinding cups were conventionally held in the grinding machine by inserting an upright hollow stem projecting from the top surface of the grinding cup into a chuck for detachable mounting. Special tools such as chuck wrenches, nuts and collets are necessary to insert, hold and to remove the grinding cup into and out of the chuck.

To eliminate the need for chuck wrenches etc. the use of a shoulder drive on the grinding cups was developed. A diametrically extending recess at the free end of a hollow drive shaft of the grinding machine co-operates with a shoulder or cam means on the adjacent top surface of the grinding cup to provide the drive means. The stem of the grinding cup, in order to provide axially and radial support, is inserted into the hollow drive shaft and may be held in place by one or more O-rings either located in a groove in the interior wall of the drive shaft or on the stem of the grinding cup. See for example Swedish Patent No. B 460, 584 and U.S. Pat. No. 5,527,206.

An alternative to the shoulder drive is shown, for example, in Canadian Patent 2,136,998. The free end of the stem of the grinding cup is machined to provide flat drive surfaces on the stem that are inserted into a corresponding drive part in the channel of the output drive shaft into which the stem is Inserted. The grinding cup is retained In place by a spring biased sleeve which forces balls mounted in the wall of the output drive shaft into an annular groove on the stem of the grinding cup.

Other innovations are illustrated in U.S. Pat. Nos. 5,639, 273 and 5,727,994. In these patents, the upright stem has been replaced with a centrally disposed hexagonal cavity provided in the top surface of the grinding cup. The cavity is shaped and sized to permit the output drive shaft of a grinding machine to be inserted into the cavity. The end of the output drive shaft has an end section having a corresponding hexagonal cross section to fit into the hexagonal cavity to provide the drive means. A second section of the output drive shaft having a circular cross section to fit into the cavity to provide axial and radial support.

Some manufacturers, in order to provide grinding cups that are compatible for use with other manufacturers' grinding machines provide adapters that connect their grinding cup to the output drive shaft of competitors' grinding machines.

Regardless of the method of connecting the grinding cup to the output drive shaft of the grinding machine, it is important to optimize the operational stability of the grinding cup. Lack of operational stability often results in vibration and resonance during grinding. Vibration and/or resonance also directly results in increased rates of wear to all moving parts such as bearings, joints, etc. of the grinding apparatus and can potentially interfere with settings within the operating control circuits of the grinding apparatus.

U.S. Pat. No. 7,402,093 addressed a number of problems with earlier machines and provided a grinding machine carried on a support system where the grinding cup is rotated at variable speeds preferably from about 2200 to 6000 RPM and the support system is capable of providing a variable feed pressure preferably or optionally up to 350 kilos. In this type of machine there is a need to control the feed pressure with precision.

However, none of the known grinding systems provide management and/or the grinding apparatus provider a means to monitor, collect and analyze data on grinding cup and grinding machine use and performance, particularly from a number of different machines, in different locations operated by different personnel.

SUMMARY OF THE INVENTION

One embodiment of the present disclosure provides grinding apparatus for grinding working tips of hard metal inserts of rock drill bits, comprising: a grinding machine, means for holding a rock drill bit to be ground and a support system, the grinding machine equipped with a spindle assembly having an output drive shaft having a longitudinal axis, one of a plurality of grinding tools of different sizes and profiles detachably connected to the output drive shaft for grinding different sizes and profiles of working tips and having a control system capable of monitoring and collecting data on operation and use of the grinding apparatus. The control system provided with each grinding machine not only is used to monitor and collect data but is capable of controlling one or more operational parameters in response to initial data inputted as well as data collected during the grinding process.

The control system in the embodiment disclosed has a programmable operator control panel that enables the operator to input data and a programmable control card provided attached to the rear of the operator control panel having a circuit board containing a central processor (i.e. microprocessor or microcontroller) for the control system of the grinding apparatus. The central processor can be located anywhere suitable for the application and can be suitably interconnected with other sub-processors and/or sensors to monitor various functions as deemed necessary for proper operation and collect data from those functions. The overall control system includes systems and controls that together with a microprocessor or microcontroller can control all aspects of the grinding apparatus including grinding time on each button, rotational speed of the grinding cup, grinding pressure, bit holder tilt function, operating lights and coolant flow. The microprocessor or microcontroller and the control system can be used to provide other functions either manual or automatic. For example, the microprocessor or microcontroller and control system, in the case of an electric motor, can monitor the amperage being used and/or the temperature and if it reaches a preset limit automatically decrease the grinding pressure to prevent motor burn out. The microprocessor or microcontroller and control system can also control the flow of coolant to the face of the button during grinding.

In addition, the control panel software can be configured such that the user could select for example whether long grinding cup life or high material removal rate of the grinding cup is preferred.

An RFID reader may be provided within operator control panel together with a touch screen display. When a grinding cup equipped with an RFID tag in accordance with present invention is scanned by the RFID reader a proximity sensor detects the RFID tag and scans the data on the tag. The data preferably includes a specific ID identifier for the particular grinding cup and the number of grinding cycles over which it has been used to date. The ID identifier data includes the grinding cup size and grinding surface profile. Once the RFID tag has been scanned the data is transmitted to the programmable microprocessor and the grinder size and profile can be displayed on the touch screen. If the grinding cup is not equipped with an RFID tag or other specific ID identifier the operator will need to manually enter the data into the control system through the operator control panel.

Further features of the invention will be described or will become apparent in the course of the following detailed description.

BRIEF DESCRIPTION OF THE DRAWINGS

In order that the disclosure may be more clearly understood, embodiments will now be described in detail by way of example, with reference to the accompanying drawings, in which.

DETAILED DESCRIPTION

Figure 1:
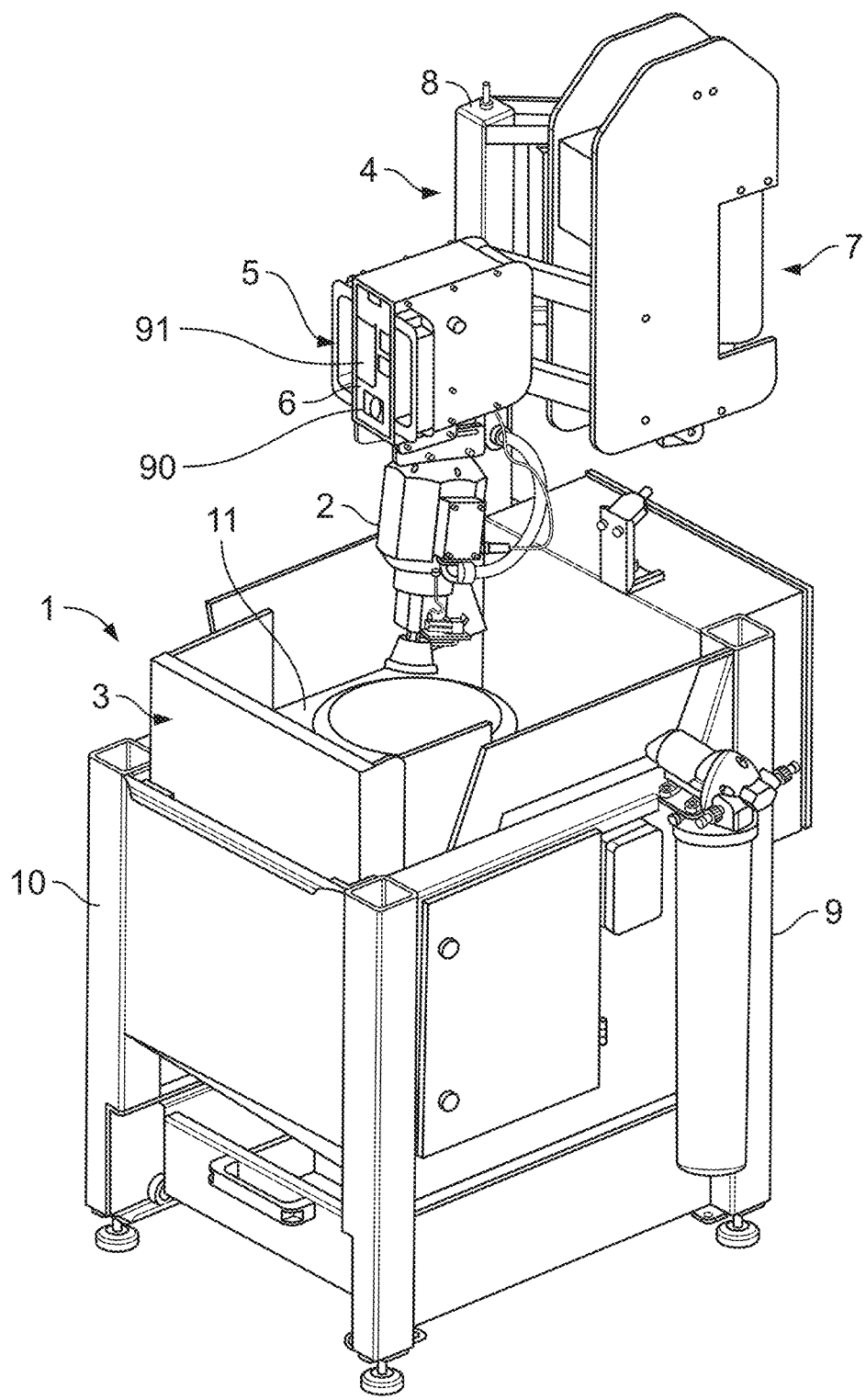
FIG. 1 is perspective view from the right side of one embodiment of a grinding apparatus having a grinding machine carried for vertical and horizontal adjustment by a support system, and means for holding the bit(s) to be ground.

With reference to the FIG. 1 an embodiment of a grinding apparatus, generally indicated at 1, having a grinding machine for grinding the hard metal inserts or working tips of rock drill bits (percussive or rotary), tunnel boring machine cutters (TBM) and raised bore machine cutters (RBM) and more specifically, but not exclusively, for grinding the cutting teeth or buttons of a rock drill bit or cutter is illustrated. The grinding apparatus 1 includes a grinding machine 2, means for holding one or more bits to be ground generally indicated at 3 and a support system generally indicated at 4. The grinding machine 2, means for holding the bits 3 and support system 4 are arranged to permit relative movement between the grinding machine 2 and the bit to be ground to permit alignment of the grinding machine 2 with the longitudinal axis of the buttons on the bit. The grinding apparatus 1 has a control system, part of which is generally indicated at 5, having a programmable operator control panel 6 capable of directly or indirectly monitoring and adjusting one or more operational parameters. The operational parameters may include feed pressure, grinding cup RPM, grinding time and other parameters as noted herein.

In the grinding apparatus 1 shown in FIG. 1, the grinding machine 2 is carried by support system 4 which includes an arm or lever system 7 journaled on a stand 8 attached to the rear 9 of an open box 10. The bit holder means 3 consists of a table 11 mounted within the box 10.

Figure 2:
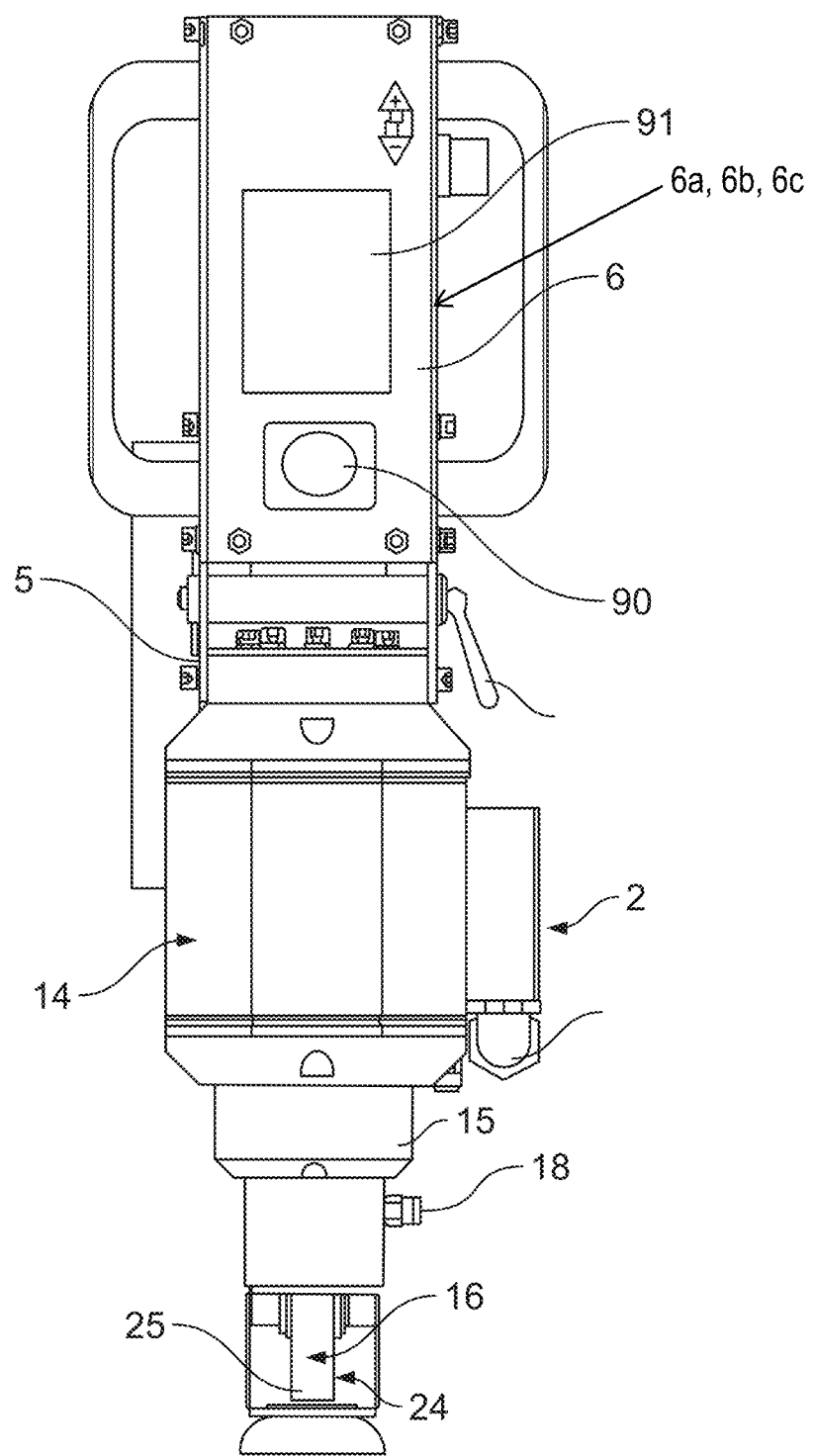
FIG. 2 is an enlarged view of a grinding machine of FIG. 1 having a spindle assembly including an output drive shaft according to the present disclosure.

In FIG. 2, an embodiment of a grinding machine 2 suitable for use with the grinding apparatus 1 of FIG. 1. FIG. 2 shows the grinding machine 2 attached to plates below a control box 12. The grinding machine 2 is locked in place by levers 13. A water-cooled electric motor, generally indicated at 14, has an exterior housing defining a chamber in which the rotor and stator are located. A drive coupling at the bottom of the housing permits attachment of the spindle assembly 15. The drive coupling is inserted into the mating drive coupling 20 on spindle assembly 15 (see FIG. 4). The spindle assembly 15 has an output drive shaft 16 to which a grinding cup can be connected. The spindle assembly 15 is attached to the electric motor housing 14 by bolts 17. As shown in FIG. 2 coolant water for delivery to the grinding cup surface is provided though connection 18. The electric motor 14 is preferably a three-phase motor. The motor can be hydraulic, electric or the like without departing from the substance of the present invention. The dimensions of the casing are such that the grinding machine may be handled manually if desired. For the latter purpose, the casing is provided with handles projecting diametrically oppositely outwardly from the casing. Suitably connected to the output drive shaft 16 by any conventional means is a holder device 24. In the Illustrated embodiment the holder device 24 Is an integral extension of the shaft 16 which constitutes a rotatable elongate drive member 25. The shaft 16 and drive member 25 are provided with a coaxial passageway 26 extending along the length or part thereof and through which coolant/flushing fluid may be directed to a grinding cup supported thereon.

Figure 3:
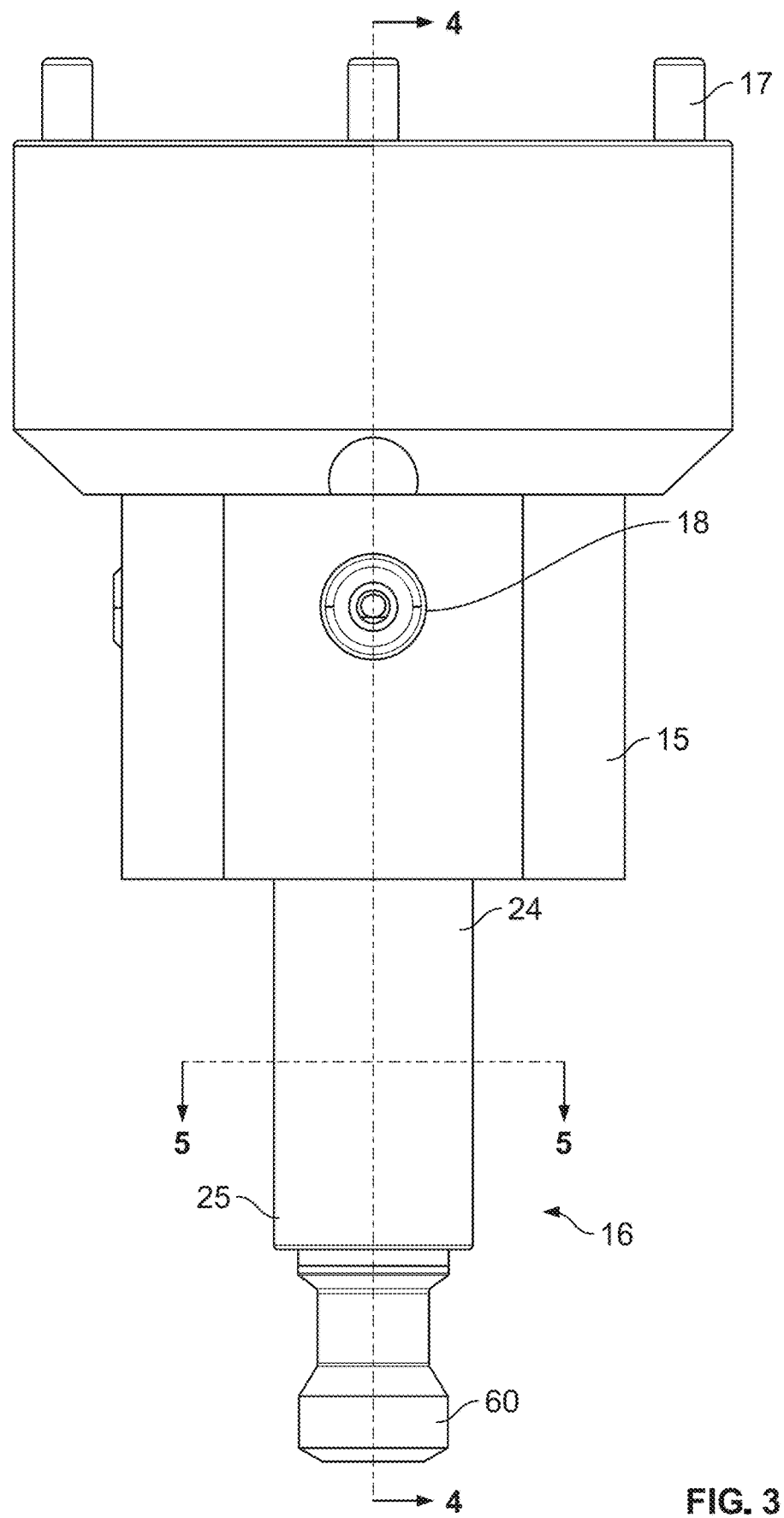
FIG. 3 is an enlarged plan view of the spindle assembly of FIG. 2 for grinding machine having an output drive shave in the form of a rotatable drive section with a connected grinding cup in accordance with the present invention.
Figure 4:
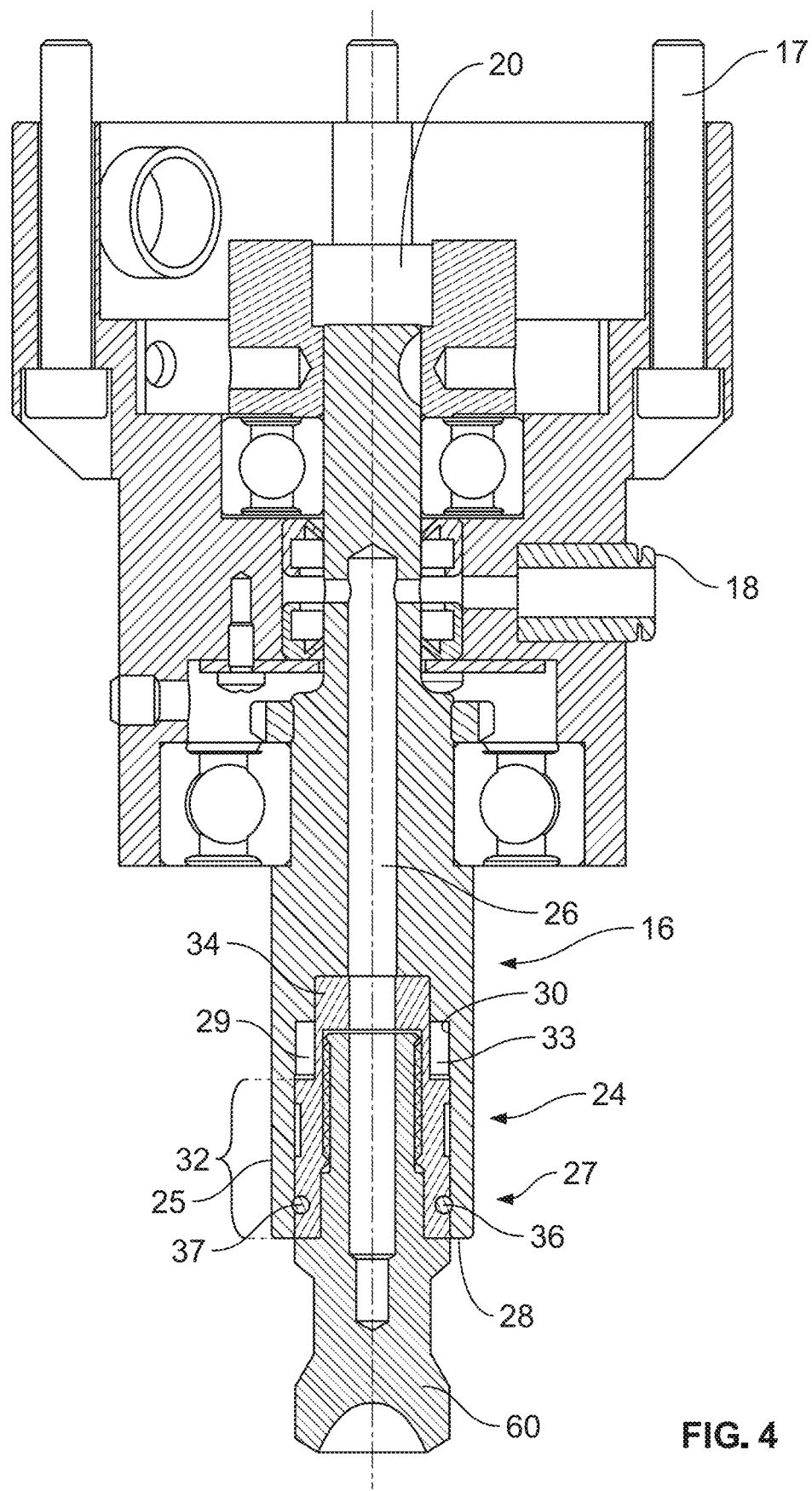
FIG. 4 is cross-section view of the spindle assembly connected grinding cup of FIG. 3 along line 4-4.
Figure 5:
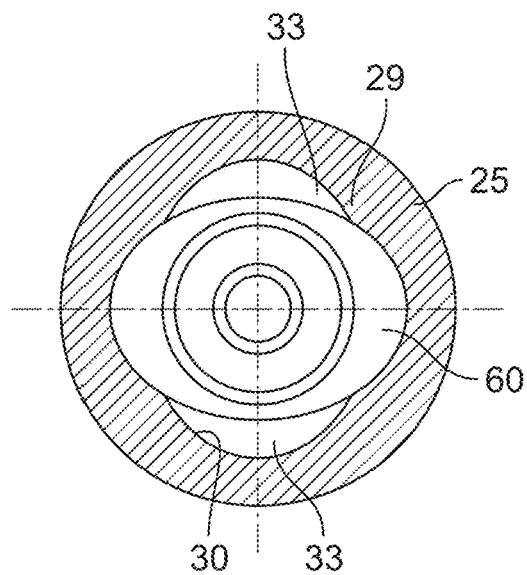
FIG. 5 is a cross-section view of the rotatable drive member shown in FIG. 3 along line 5-5
Figure 6:
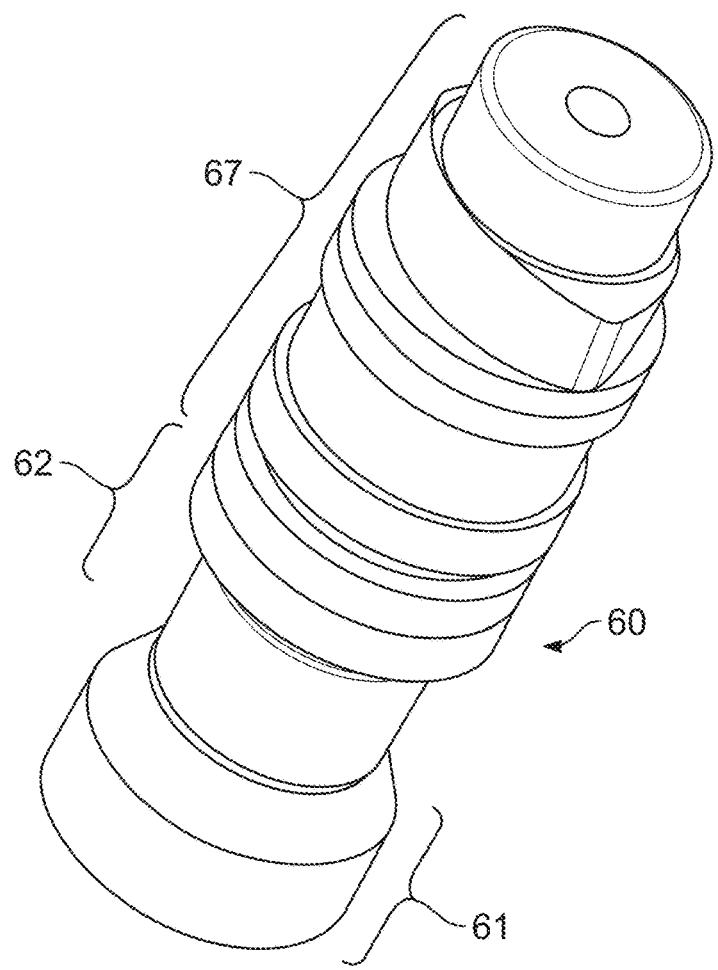
FIG. 6 is a perspective view of one embodiment of a grinding cup in accordance with the present invention.
Figure 7:
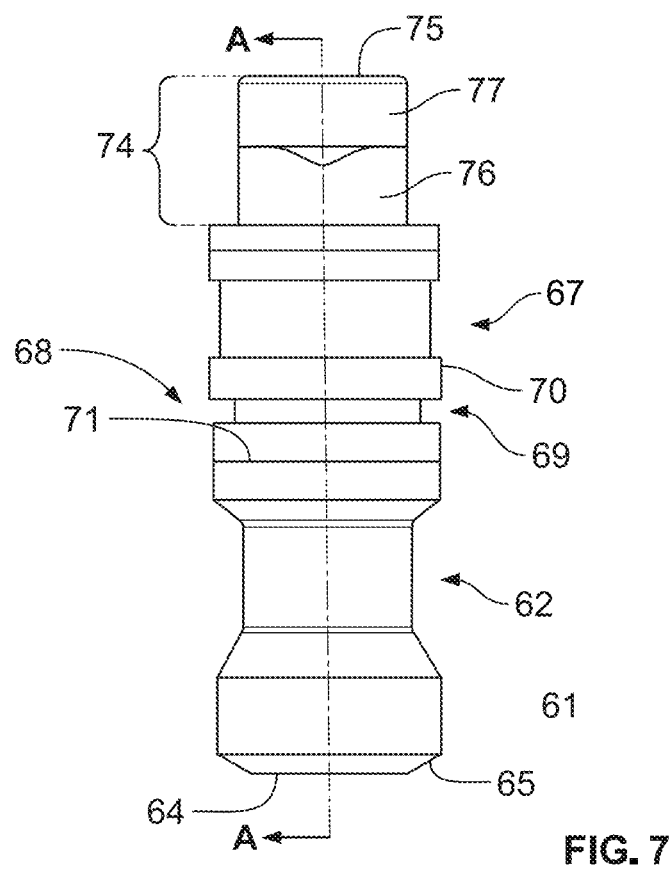
FIG. 7 is a front plan view of the grinding cup of FIG. 6.
Figure 8:
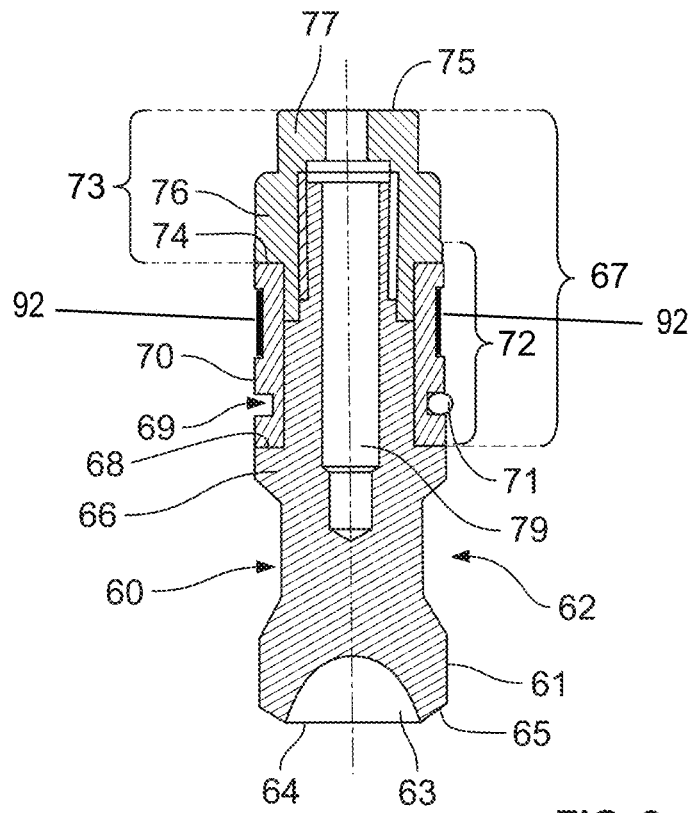
FIG. 8 is a partial cross-section of the grinding cup of FIG. 7 along line A-A.
Figure 9:
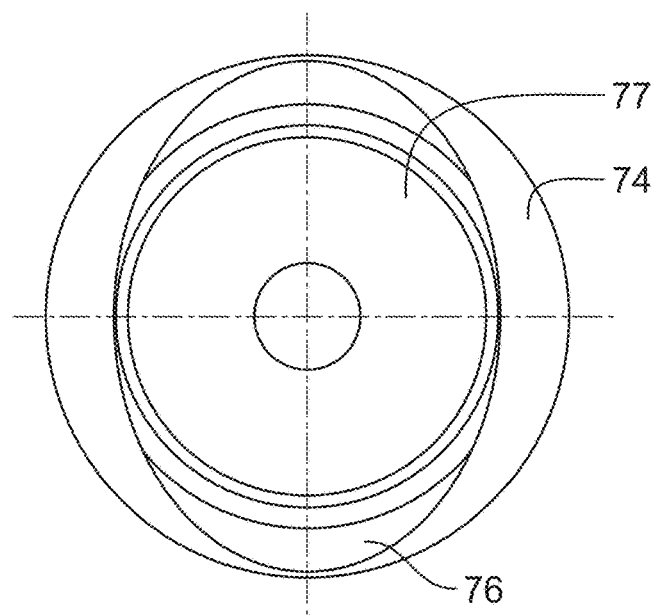
FIG. 9 is a top plan view of the grinding cup of FIG. 7.
Figure 10:
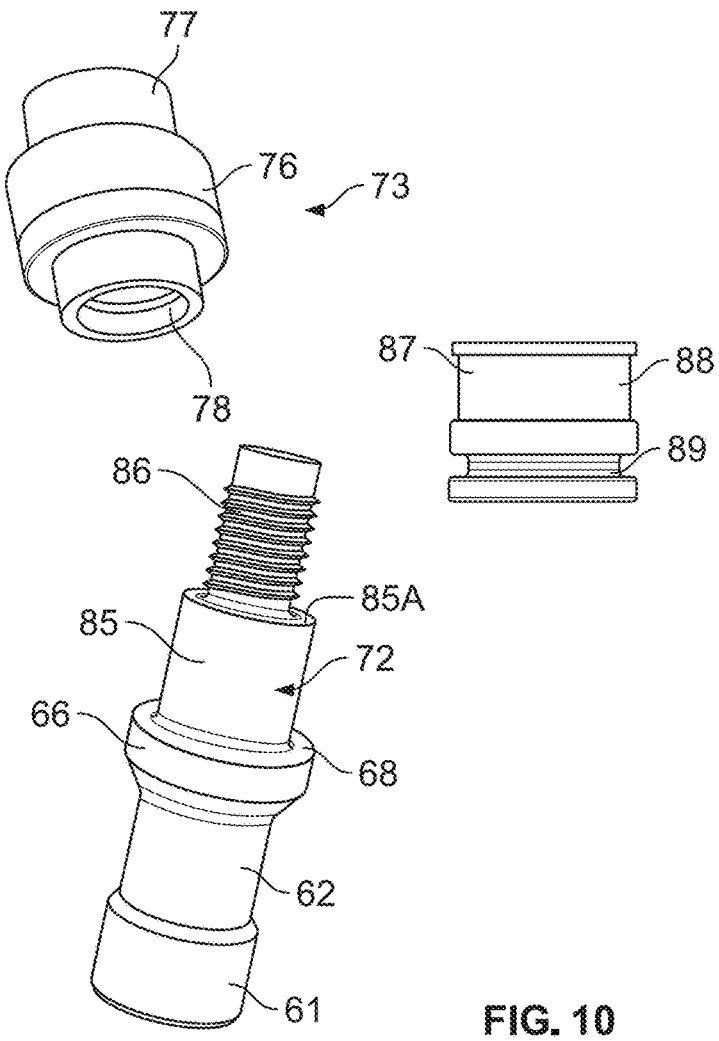
FIG. 10 is photograph of the component parts of another embodiment of a grinding cup according to the present invention.
Figure 11:
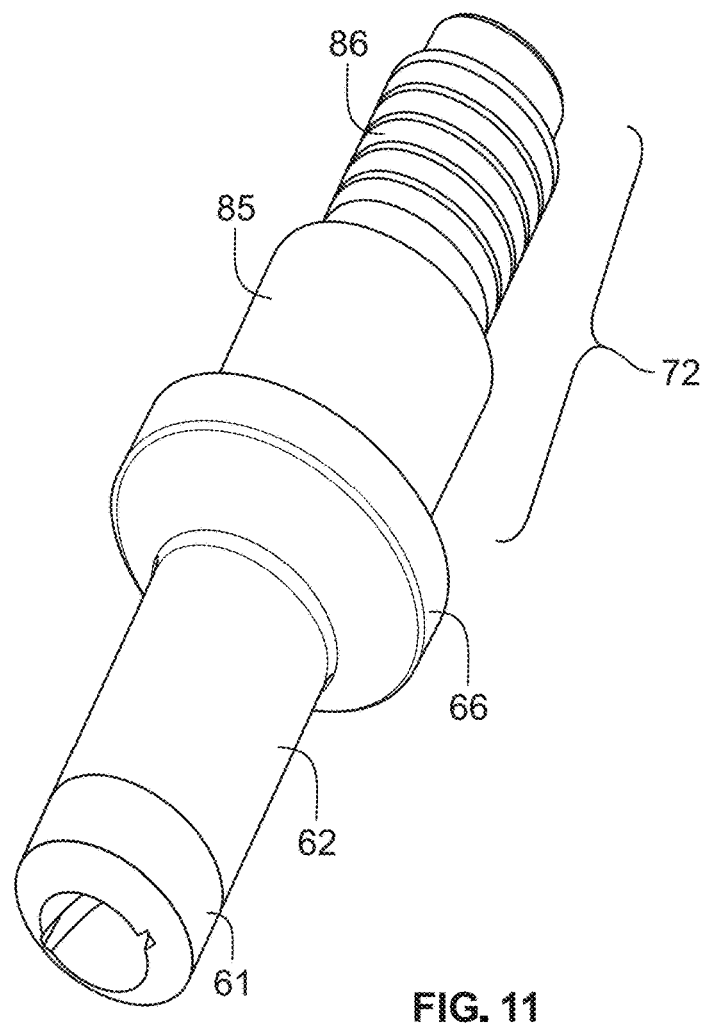
FIG. 11 is a perspective view of another embodiment of the grinding section and upper body section of a grinding cup according to the present invention.
Figure 12:
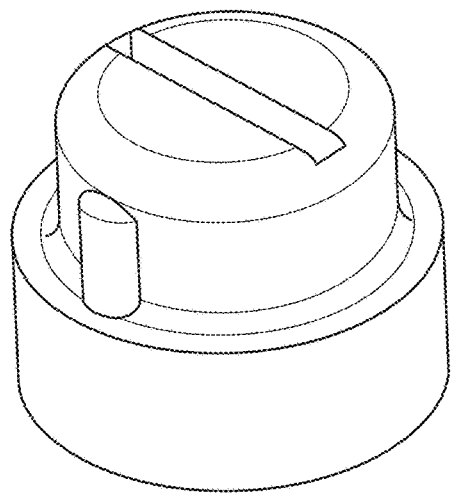
FIG. 12 is a perspective view of the grinding section shown in FIG. 11.
Figure 13:
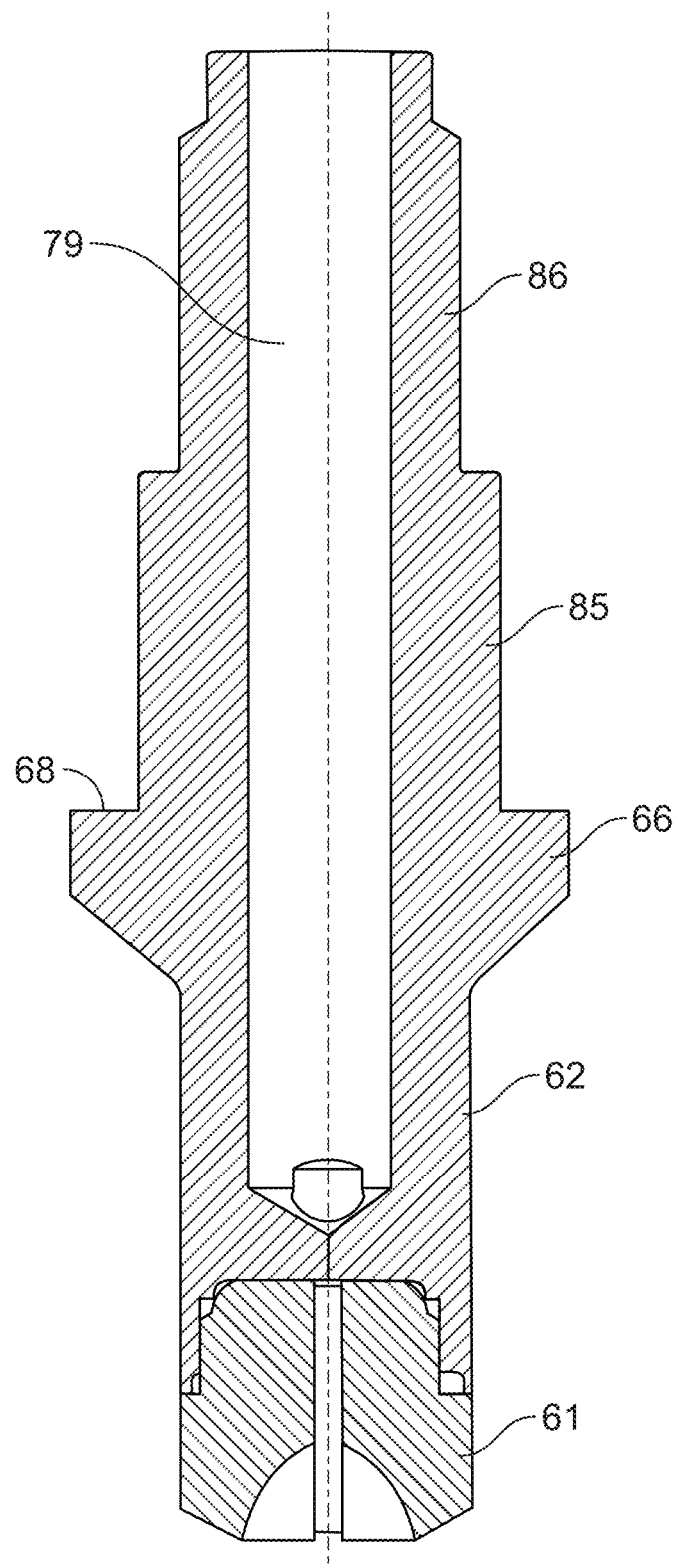
FIG. 13 is a cross-section of the grinding section and upper body section of a grinding cup of FIG. 11.

With reference to the FIGS. 3-5 one embodiment of a spindle assembly, generally indicated at 15, for a grinding machine for grinding the hard metal inserts or working tips of rock drill bits (percussive or rotary), tunnel boring machine cutters (TBM) and raised bore machine cutters (RBM) and more specifically, but not exclusively, for grinding the cutting teeth or buttons of a rock drill bit or cutter is illustrated. The spindle assembly 15 can be used with a range of different manual and semi-automatic grinding machines including hand held grinders, single arm and double arm grinding machines and grinders designed specifically for mounting on drill rigs, service vehicles or set up in the shop. The spindle assembly 15 has an output drive shaft 16 with, in the embodiment illustrated, a detachable grinding cup 60 is connected.

The spindle assembly 15 is intended to be drivably connected to the motor of a grinding machine (not shown). The spindle assembly 15 is attached to the motor housing by bolts 17. A drive coupling at the bottom of the motor housing permits attachment of a mating drive coupling 20 on the spindle assembly 15. The spindle assembly 15 has an output drive shaft 16 to which a grinding cup 60 can be detachably connected. Coolant water for delivery to the grinding cup surface is provided though connection 18. Suitably connected to the output drive shaft 16 by any conventional means is a holder device 24. In the illustrated embodiment, the holder device 24 is an integral extension of the shaft 16 which constitutes a rotatable elongate drive member 25. The shaft 16 and drive member 25 are provided with a coaxial passageway 26 extending along the length or part thereof and through which coolant/flushing fluid may be directed to a grinding cup 60 supported thereon, the grinding cup being shown in FIGS. 6-13 and described in detail below. An end portion 27 of the elongate drive member 25, extending from its free end 28, is provided with a centrally disposed recess 29 co-axial with passageway 26, adapted to accommodate a corresponding sized and shaped upright drive section on grinding cup 60 (see FIGS. 6-13).

As shown in FIGS. 4 & 5, the interior wall 30 of the recess 29 in drive member 25 is machined to allow the grinding cup 60 to drivably engage within the recess 29. In the embodiment illustrated recess 29 has a support section 32 extending from the free end 28 and co-axial with passageway 26. Adjacent the support section 32 a series of lobed grooves 33 that are machined into interior wall 30. A pair of opposite lobed grooves 33 are sized to match an elliptical portion of the drive section on the grinding cup 60. Adjacent to the series of annular grooves 33 is a second support section 34 in recess 29. This design permits the upright drive section of grinding cup 60 to be inserted easily within recess 29 without the necessity of specific alignment of the drive member and grinding cup. The grinding cup can simply be pushed on the drive member 25 and can be rotated so the elliptical drive section fits within a pair of lobed grooves 33. When the grinding cup 60 is positioned in recess 29, the drive member 25 will rotate the grinding cup without slipping when in use. Further the present disclosure maximizes the contact surfaces between the upright drive section on grinding cup 60 and the interior wall 30 of recess 29 on drive member 25. This reduces the wear to all key drive/contact surfaces of the output drive shaft (rotor) and grinding cup which provide consistent, proper alignment between grinding cup and or adapter and the rotor during operation.

Retaining means may be provided in recess 29 of drive member 25 to detachably retain the grinding cup 60 so that grinding cup 60 will not fly off during use but can still be easily removed or changed after use. The retaining means may include one or more annular grooves 36 in the interior wall 30 within the support section 32 of recess 29 in drive member 25. O-rings or expansion rings 37 may be inserted into the grooves.

FIGS. 6-9 illustrate one embodiment of a grinding cup 60 for detachable connection to the output drive shaft 16 of a grinding machine for grinding buttons on drill bits or cutters according to the present invention. The grinding cup 60 consists of a lower grinding section generally indicated at 61 and an upper body section 62 co-axial with said grinding section 61 to form said grinding cup 60. A centrally disposed recess 63 is formed in the bottom surface 64 of the grinding section 61 having the desired profile for the button to be ground.

The bottom (grinding) surface 64 and the surface of the centrally disposed recess 63 formed in the bottom surface 64 of the grinding section 61 are formed from a material capable of grinding the tungsten carbide button bits. In the embodiment illustrated, the grinding surface is formed from a metal and diamond matrix. The peripheral edge 65 in the bottom surface 64 is beveled to facilitate the removal of steel from the face of the bit around the base of the button during grinding.

The upper body section 62 has an upper base 66 having a centrally disposed upright drive section 67 formed on the top surface 68 of the base 66. The drive section 67 is shaped and sized to drivably engage within the corresponding recess 29 at the free end 28 of the output drive shaft 16 of said grinding machine. Retaining means, generally indicated at 69, for detachably connecting the grinding cup to the output drive shaft of the grinding machine are provided on the upright drive section 67. In the embodiment illustrated the retaining means comprises an annular groove 69 in the outer surface 70 of the upright drive section 67 sized and shaped to retain an O-ring 71.

In the embodiment illustrated, the upright drive section 67 has a first support section 72 connected to the top surface 68 of upper base 66 and having a circular cross section. A co-axial drive section 73 on the upright drive section 67 extends from a top surface 74 of the first support section 72 to a free end 75 of the drive section 67. The co-axial drive section 73 has a lower portion 76 in the form of a cam having an elliptical cross section, shaped and sized to fit within a corresponding pair of lobed grooves 33 (see FIG. 4) in sidewall 30 of the recess 29 in the output drive shaft 16. An upper portion 77, co-axial with lower portion 76, has a circular cross-section slightly less than the diameter of an upper portion 78 of the recess 29 in the output drive shaft 16.

A passageway 79 is provided through the upright drive section 67 and upper body section 62. The passageway 79 is co-axial with the upright drive section 67 and upper body section 62 and communicates with one or more openings (not shown) on the grinding surface 64 through which coolant/flushing fluid may be directed to the surface of the button being ground during grinding.

As noted above, the grinding apparatus 1 has a control system, part of which is generally indicated at 5, having a programmable operator control panel 6 capable of directly or indirectly monitoring and adjusting one or more operational parameters. A programmable control card 6a is provided attached to rear of operator control panel 6, having a circuit board 6b containing the central processor 6c(ie. microprocessor or microcontroller) for the control system of the grinding apparatus. The central processor can be located anywhere suitable for the application and can be suitably interconnected with other sub-processors to monitor various functions as deemed necessary for proper function. The overall control system includes systems and controls that together with a microprocessor or microcontroller can control all aspects of the grinding apparatus including grinding time on each button, rotational speed of the grinding cup, grinding pressure, bit holder tilt function, operating lights and coolant flow. The microprocessor or microcontroller and the control system can be used to provide other functions either manual or automatic. For example, the microprocessor or microcontroller and control system, in the case of an electric motor, can monitor the amperage being used and/or the temperature and if it reaches a preset limit automatically decrease the grinding pressure to prevent motor burn out. The microprocessor or microcontroller and control system can also control the flow of coolant to the face of the button during grinding.

In addition, the control panel software can be configured such that the user could select for example whether long grinding cup life or high material removal rate of the grinding cup is preferred.

When using a grinding cup of the type illustrated in FIGS. 6-13, an RFID reader 90 is provided within operator control panel 6 together with a touch screen display 91. When the free end 75 of a grinding cup 60 equipped with an RFID tag 92 in accordance with present invention is inserted into the RFID reader 90 a proximity sensor detects the RFID tag 92 and scans the data on the tag. The data preferably includes a specific ID identifier for the particular grinding cup 60 and the number of grinding cycles over which it has been used to date. The ID identifier data includes the grinding cup size and grinding surface profile. Once the RFID tag 92 has been scanned the data is transmitted to the programmable microprocessor and the grinder size and profile can be displayed on the touch screen.

Figure 14:
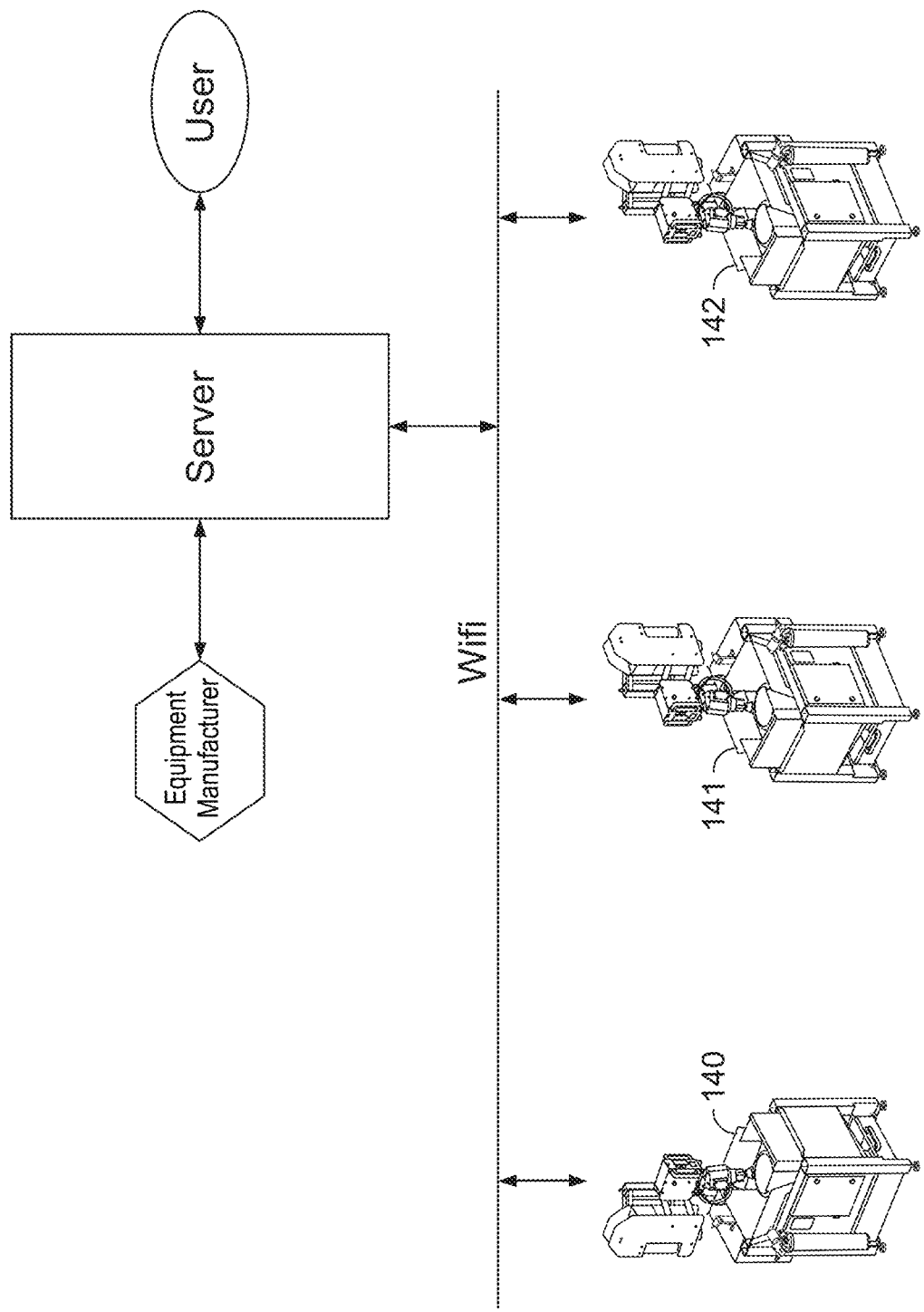
FIG. 14 is a schematic outline of a network of a plurality of grinding apparatus having a control system according to the present invention.

FIG. 14 illustrates schematically how utilizing grinding apparatus equipped with enhanced control systems according to the present invention can be beneficial. FIG. 14 illustrates a site having a plurality of grinding apparatus 140,141,142 according to the present invention. The control system of each of the grinding apparatus 140,141,142 are networked and can communicate over an internet or other connection to a server or virtual server located remotely from the grinding apparatus. FIG. 14 shows a WiFi connection but other forms of connection such as cellular are possible.

In a preferred embodiment of the control system of the present invention, each operator of the grinding apparatus is required to login before using one of grinding apparatus and log out after use. Login can be by way of the touch screen display on the grinding apparatus or a token containing operator ID data such as in the form of key fob, that can be scanned or connected when in proximity to the grinding apparatus. Requiring operator login insures only persons trained in the proper and safe operation of the grinding apparatus are utilizing same. A further benefit to management is that hard data can be communicated from the grinding apparatus on operator performance and efficiency.

After the operator has logged in and the grinding apparatus is ready for normal operation, the operator puts a bit into the means on the grinding apparatus for holding the bits to be ground. Once the bit is secure the operator selects a grinding cup of the type illustrated in FIGS. 6-13 having the proper size and profile of the buttons on the bit that are to be ground. When using a grinding cup of the type illustrated in FIGS. 6-13, when the free end of the grinding cup equipped with an RFID tag in accordance with present invention is inserted into the RFID reader a proximity sensor detects the RFID tag and scans the data on the tag. The data preferably includes a specific ID identifier for the particular grinding cup and the number of grinding cycles over which it has been used to date. The ID identifier data includes the grinding cup size and grinding surface profile. Once the RFID tag has been scanned the data is transmitted to the programmable microprocessor and the grinder size and profile can be displayed on the touch screen to confirm the operator has selected the correct size and profile of grinding cup. The control system tracks the use of the particular grinding cup and the grinding apparatus it is being used on and records the number of cycles it has been used. When the operator has finished using a particular grinding cup he disconnects it from the output drive shaft and the free end of the grinding cup is inserted into the RFID reader so that data on the number of cycles it has been used is transcribed to the RFID tag as well as transmitted to the server.

The use of the control system of the present invention provides the management of the grinding facility with valuable data on the operation, performance and life of not only the grinding cups but the grinding apparatus and can compare performance of different grinding apparatus in the same or different facilities.

The control system of the grinding apparatus can be pre-programmed with recommended operational parameters for different sizes and profiles of grinding cups. On reading the RFID tag associated with a particular grinding cup, the control system can automatically set the grinding time and feed pressure for the grinding cup. The operator can be provided with an override ability to increase or decrease grinding time and or feed pressure where the button wear is more or less than normal.

By connecting each grinding apparatus to a network and to the internet, the control system equipped with transmitter and receiver capability allows the equipment manufacturer to be advised of error messages during operation of the grinding apparatus and either fix the error and/or schedule maintenance on the grinding apparatus. It also provides a means for the manufacturer to quickly install software upgrades or fixes. Finally, the data received by the manufacturer assists in designing further improvements to the equipment.

Having illustrated and described a preferred embodiment of the invention and certain possible modifications thereto, it should be apparent to those of ordinary skill in the art that the invention permits of further modification in arrangement and detail and is not restricted to the specific semi-automatic grinding apparatus illustrated.

It will be appreciated that the above description related to the preferred embodiment by way of example only. Many variations on the invention will be obvious to those knowledgeable in the field, and such obvious variations are within the scope of the invention as described and claimed, whether or not expressly described.

The embodiments of the invention in which an exclusive property or privilege is claimed are defined as follows:

1. A grinding apparatus for grinding working tips of hard metal inserts of rock drill bits, comprising:
   a grinding machine, means for holding a rock drill bit to be ground and a support system, the support system comprising an arm or lever system for providing a controlled variable feed pressure during grinding,
   the grinding machine equipped with a spindle assembly having an output drive shaft having a longitudinal axis, the spindle assembly providing a controlled variable speed of rotation during grinding,
   a grinding cup detachably connected to the output drive shaft for grinding the working tips of hard metal inserts of rock drill bits; and
   a control system comprising:
      a programmable operator control panel configured to directly or indirectly monitor and adjust at least one operational parameter wherein the operation parameter comprises feed pressure, grinding cup RPM, grinding time or coolant flow, and
      a programmable control card comprising a circuit board and a central processor, and
   an RFID reader connected to the control system, the RFID reader having a proximity sensor configured to detect an RFID tag on a grinding cup containing specific ID data including a size and profile of the grinding cup, the RFID reader configured to transmit the specific ID data to the control system to control the speed of rotation of the output drive shaft and the feed pressure during grinding.

2. The grinding apparatus according to claim 1, wherein the control system on the grinding apparatus is equipped with a transmitter and a receiver to enable the grinding apparatus to communicate over the internet to a server or virtual server located remotely from the grinding apparatus.

3. The grinding apparatus according to claim 2, wherein the control system on the grinding apparatus is configured to communicate over the internet to a server or virtual server located remotely from the grinding apparatus utilizing a WiFi connection.

4. The grinding apparatus according to claim 2, wherein the control system on the grinding apparatus is configured to communicate over the internet to a server or virtual server located remotely from the grinding apparatus utilizing a cellular connection.

5. A plurality of grinding apparatuses according to claim 1, wherein the control system of each of the plurality of grinding apparatus are networked together and configured to communicate over an internet or other connection to a server or virtual server located remotely from the grinding apparatus.

6. The grinding apparatus according to claim 1, wherein the control system further comprises a touch screen display configured to display the size and profile of the grinding cup.

7. A method of grinding working tips of hard metal inserts of rock drill bits, using grinding apparatus according to claim 1, the method comprising the following steps:
   (a) inserting and securing a rock drill bit to be ground into the means for holding the rock drill bit to be ground,
   (b) determining the size and profile of a first one of the one or more working tips on the rock drill bit to be ground,
   (c) selecting a grinding cup corresponding to the size and profile of the first one of the one or more working tips to be ground, the grinding cup having an RFID tag containing data that includes a specific ID identifier for the particular grinding cup,
   (d) scanning the RFID tag on the grinding cup using the RFID reader and transmitting the data on the RFID tag to the central processor;
   (e) detachably connecting the grinding cup to the output drive shaft of the grinding machine;
   (f) aligning the grinding cup about the longitudinal axis of the first one of the working tips to be ground,
   (g) setting a rotational speed of the output drive and a feed pressure based on the data scanned from the RFID tag;
   (h) grinding the first one of said working tips to be ground at the rotational speed, feed and grinding time determined by the central processor;
   (i) after grinding a first one of said working tips to be ground, aligning the grinding cup about the longitudinal axis of another one of said working tips to be ground having the same size and profile of the first one of the working tips, then grinding the another one of said working tips to be ground at the rotational speed, feed and grinding time determined by the central processor;
   (j) repeat step (i) until all of the working tips on the rock drill bit of the same size and profile have been ground;
   (k) the control system monitoring and tracking the number of rotations the grinding cup is used during grinding; and
   (l) removing the grinding cup from the output drive shaft of the grinding machine.

8. The method of grinding working tips of hard metal inserts of rock drill bits according to claim 7, wherein the control system further comprises a touch screen display, and further comprising the step of displaying the size and profile of the grinding cup on the touch screen display.

9. The method of grinding working tips of hard metal inserts of rock drill bits according to claim 8, wherein an after step (g), an operator confirms the size and profile of the grinding cup displayed on the touch screen display is correct.

10. The method of grinding working tips of hard metal inserts of rock drill bits according to claim 7, wherein the control system uses the RFID reader to update the data on the number of rotations the particular grinding cup has been used for during grinding and transcribes the updated data to the RFID tag on the grinding cup.

11. The method of grinding working tips of hard metal inserts of rock drill bits according to claim 7, wherein during step (i) the control system controls, monitors and adjusts the at least one operational parameter during grinding.

12. The method of grinding working tips of hard metal inserts of rock drill bits according to claim 7, wherein the control system on the grinding apparatus is equipped with a transmitter and a receiver configured to enable the grinding apparatus to communicate over the internet to a server or virtual server located remotely from the grinding apparatus.

13. The method of grinding working tips of hard metal inserts of rock drill bits according to claim 12, wherein the control system on the grinding apparatus communicates over the internet to a server or virtual server located remotely from the grinding apparatus utilizing a WiFi or cellular connection.

14. The method of grinding working tips of hard metal inserts of rock drill bits according to claim 13, wherein there are a plurality of the grinding apparatus and wherein the control system of each of the plurality of the grinding apparatus are networked together.

15. The method of grinding working tips of hard metal inserts of rock drill bits according to claim 8, wherein an operator logs in before using the grinding apparatus for grinding before using the touch screen display or a token containing operator ID data.

16. A grinding apparatus for grinding working tips of hard metal inserts of rock drill bits, the grinding apparatus comprising:
  a grinding machine carried on a support system journaled on a stand, and the grinding machine further comprising means for holding one or more bits to be ground,
  the grinding machine equipped with a spindle assembly having an output drive shaft having a longitudinal axis and means to detachably retain a grinding cup for grinding the working tips of hard metal inserts of rock drill bits,
  the output drive shaft driven by a motor to rotate the grinding cup about its longitudinal axis,
  the support system comprises an arm or lever system to control movement of the grinding machine for alignment of the grinding machine with a hard metal insert to be ground and a feed pressure for said grinding machine during grinding, and
  a programmable control system to monitor, control and adjust at least one operational parameter, wherein the operational parameter comprises feed pressure, grinding cup RPM, grinding time or coolant flow, the programmable control system comprising an RFID reader, and a touch screen display, the RFID reader having a proximity sensor configured to detect an RFID tag on a grinding cup containing specific ID data including a size and profile of the grinding cup and scanning the specific ID data on the RFID tag, the RFID reader configured to transmit the specific ID data to the programmable control system to the control system to control the speed of rotation of the output drive shaft and the feed pressure during grinding, and displaying the size and profile of the grinding cup on the touch screen display.

17. The grinding apparatus according to claim 16, wherein the control system on the grinding apparatus is equipped with a transmitter and a receiver configured to enable the grinding apparatus to communicate over the internet to a server or virtual server located remotely from the grinding apparatus.

18. The grinding apparatus according to claim 17, wherein the control system on the grinding apparatus communicates over the internet to a server or virtual server located remotely from the grinding apparatus utilizing a WiFi connection.

19. The plurality of grinding apparatuses according to claim 18, wherein the control system of each of the plurality of grinding apparatus are networked together and configured to communicate over an internet or other connection to a server or virtual server located remotely from the plurality of grinding apparatus.

* * * * *

UNITED STATES PATENT AND TRADEMARK OFFICE
CERTIFICATE OF CORRECTION

| | |
|---|---|
| PATENT NO. | : 12,303,983 B2 |
| APPLICATION NO. | : 17/621245 |
| DATED | : May 20, 2025 |
| INVENTOR(S) | : Sjolander et al. |

It is certified that error appears in the above-identified patent and that said Letters Patent is hereby corrected as shown below:

On the Title Page

Item (57) In the Abstract, at Line 6, after the word "grinding", delete "tool".

Item (57) In the Abstract, at Line 10, after the word "parameters", add a ".".

Signed and Sealed this
Eighth Day of July, 2025

Coke Morgan Stewart
*Acting Director of the United States Patent and Trademark Office*